United States Patent

Arajs et al.

[11] Patent Number: 5,746,651
[45] Date of Patent: May 5, 1998

[54] EYEBALL OUTLET ASSEMBLY

[75] Inventors: Guntis Arajs, Scarborough; Dennis Patel, Markham, both of Canada

[73] Assignee: Collins & Aikman Plastics, Inc., Troy, Mich.

[21] Appl. No.: 592,065

[22] Filed: Jan. 26, 1996

[51] Int. Cl.$^6$ ............................................. B60H 1/34
[52] U.S. Cl. ................................... 454/154; 454/286
[58] Field of Search ........................... 454/154, 155, 454/286, 316

[56] References Cited

U.S. PATENT DOCUMENTS

| | | |
|---|---|---|
| 2,103,599 | 12/1937 | Sperry et al. . |
| 2,885,943 | 5/1959 | Divizia . |
| 3,238,861 | 3/1966 | Fromme . |
| 3,276,347 | 10/1966 | Atkinson et al. ............ 454/154 |
| 3,572,233 | 3/1971 | Bar et al. . |
| 3,835,759 | 9/1974 | Lloyd ........................ 454/154 |
| 3,898,921 | 8/1975 | Trube et al. ............... 454/154 |
| 4,006,673 | 2/1977 | Meyer et al. . |
| 4,092,907 | 6/1978 | Meyer et al. . |
| 5,046,406 | 9/1991 | Harris et al. ............... 454/316 X |
| 5,072,657 | 12/1991 | Sakai ........................ 454/153 |
| 5,397,267 | 3/1995 | Vecellio et al. ............ 454/36 X |

FOREIGN PATENT DOCUMENTS 826791  1/1960  United Kingdom .................... 454/286

*Primary Examiner*—Harold Joyce
*Attorney, Agent, or Firm*—Bliss McGlynn, P. C.

[57] ABSTRACT

The outlet assembly (10) includes a housing (14) and a barrel or eyeball (20) moveable therein. The barrel (20) includes directional vanes (22) for redirecting air. A retainer ring (24) interconnects the barrel (20) in the housing and allows rotation of the barrel (20) about a first axis (A) which extends through a diameter of the retainer ring (24) and about a second axis (B) which extends through the center point of the retainer ring (24) perpendicular to the first axis (A) and in a plane extending through the perimeter of the ring (24). The retainer ring (24) slides along a guide (26) within the housing (14), and the barrel (20) pivots about pivot pins (28,30) connected to the retainer ring (24).

17 Claims, 2 Drawing Sheets

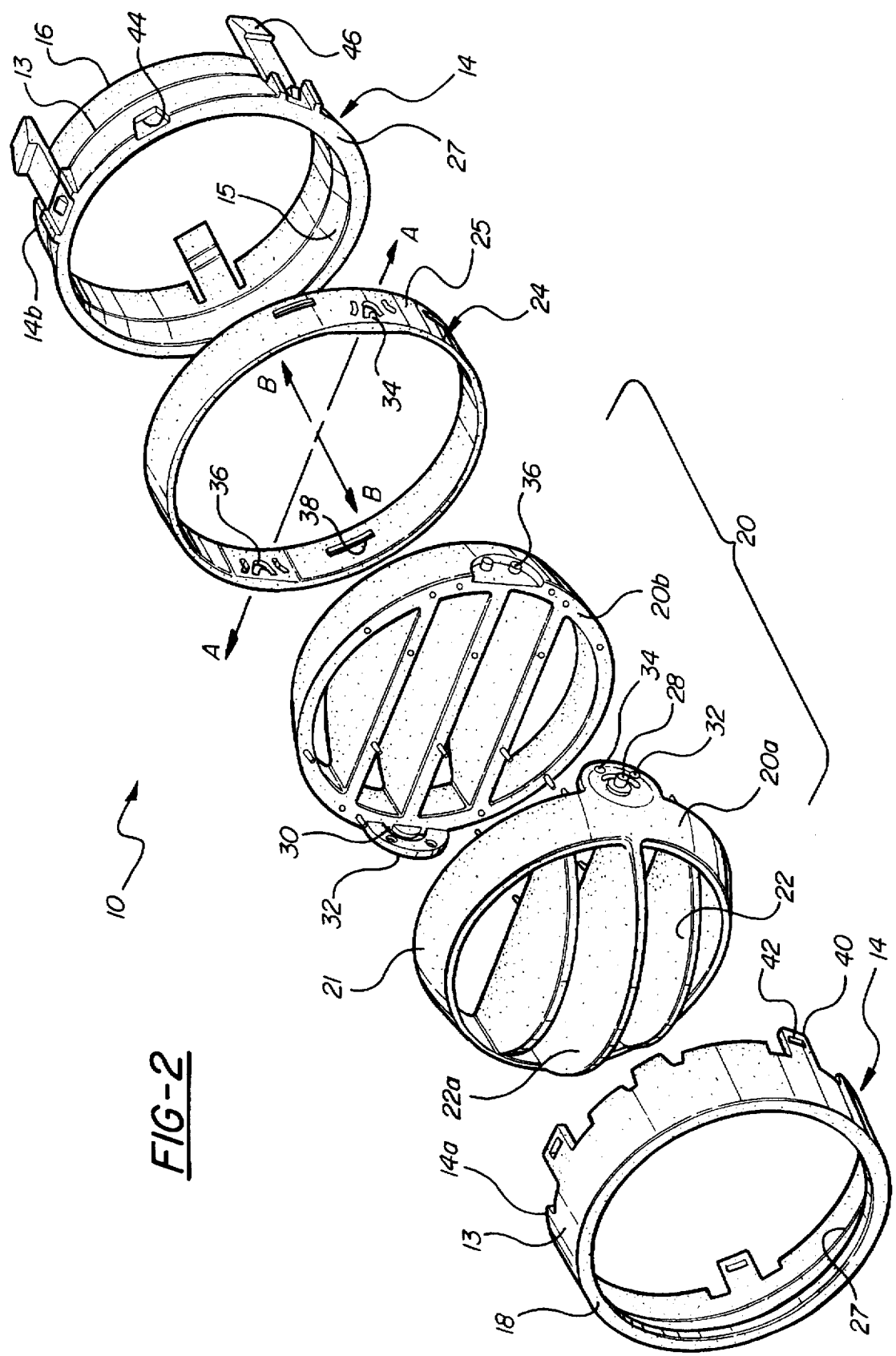

EYEBALL OUTLET ASSEMBLY

BACKGROUND OF THE INVENTION

1. Field of the Invention

The present invention relates generally to outlet or ventilating air nozzles of the universal movement type, and more particularly to those utilized in vehicles.

2. Description of the Related Art

Ventilating systems in automobiles are commonly known in the art. It is important in automobiles to allow the occupants to direct air as desired to various location of the vehicle. Therefore, it is required that outlet nozzles allow pivotal or rotational movement of the air directing vanes by the occupant to selectively adjust the direction of air flow.

One type of outlet nozzle is the universal or eyeball outlet. Exemplary of such type of outlet is U.S. Pat. No. 4,006,673 issued Feb. 8, 1977 in the name of Meyer et al. The patent discloses an adjustable air outlet nozzle having a spherical hollow nozzle connected to a surrounding housing by an intermediate gimble ring. The gimble ring is attached to the housing by pivot points and is attached to the nozzle by pivots points. Therefore, pivotal rotation is about the pins which are spaced about the perimeter of the gimble ring.

U.S. Pat. No. 4,092,907 issued Jun. 6, 1978 in the name of Meyer et al. also discloses an adjustable outlet nozzle having a double wing butterfly valve arranged inside a convex spherically shaped ring which is universally pivotally supported by a concave spherically shaped housing. In other words, the ring is universally moveable within the housing.

U.S. Pat. No. 2,885,943 issued May 12, 1959 in the name of Divizia discloses a ventilating apparatus formed of substantially a sphere which may be universally rotated within the housing. Both U.S. Pat. No. 3,835,759 issued Sep. 17, 1974 in the name of Lloyd, and U.S. Pat. No. 3,238,861 issued Mar. 8, 1966 in the name of Fromme disclose similar types of ventilating nozzles.

U.S. Pat. No. 3,898,921 issued Aug. 12, 1975 in the name of Trube et al. discloses an outlet including an elongated vent in which the vertical vanes are pivotable side-to-side and the entire unit is able to be rotated upward and downward. Pins are utilized in each of the situations to cause rotation either of the vanes or of the unit.

U.S. Pat. No. 3,572,233 issued Mar. 23, 1971 in the name Bar et al. discloses a unit whereby pins are utilized to allow rotation upward and downward with respect to a housing and vanes extend vertically within the housing which are pivotable through opposing pins and a side two side relation. U.S. Pat. No. 5,072,657 issued Dec. 17, 1991 in the name of Sakai discloses a similar type of design.

SUMMARY OF THE INVENTION

The invention is an air outlet assembly for directing air in a plurality of directions. The assembly comprises a housing having an air inlet and an air outlet and a circular interior housing surface. A barrel is rotatable within the housing and includes directional vanes connected across the barrel for directing air in a plurality of directions. A retainer ring rotatably interconnects the housing and the barrel and defines a first axis extending across a diameter of the ring and a second axis extending longitudinally through the ring transverse to the first axis. One of the barrel or the housing is connected to the retainer ring to be relatively rotatable solely about the first axis and the other of the housing or the barrel is connected to the retainer ring to be relatively rotatable solely about the second axis.

BRIEF DESCRIPTION OF THE DRAWINGS

Advantages of the subject invention will be readily appreciated as the same becomes better understood by reference to the following detailed description when considered with the accompanying drawings wherein:

FIG. 2 is an exploded view of the subject invention; and

DESCRIPTION OF THE PREFERRED EMBODIMENT

Figure 1:
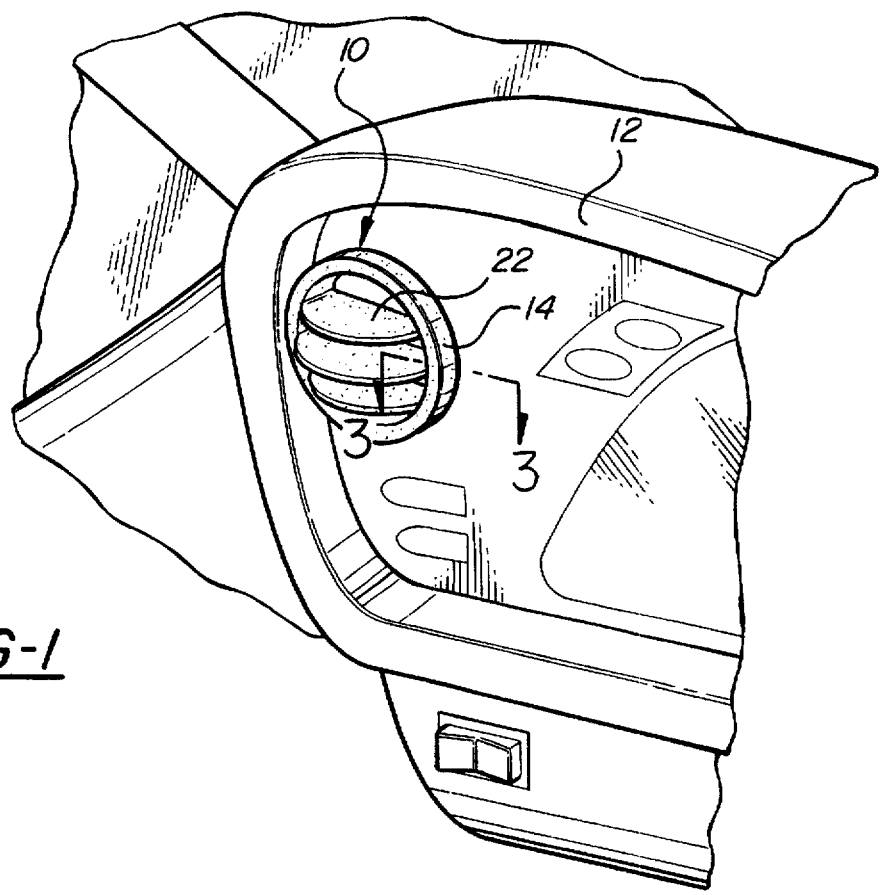
FIG. 1 is a perspective view of the subject invention as used in a vehicle.
Figure 3:
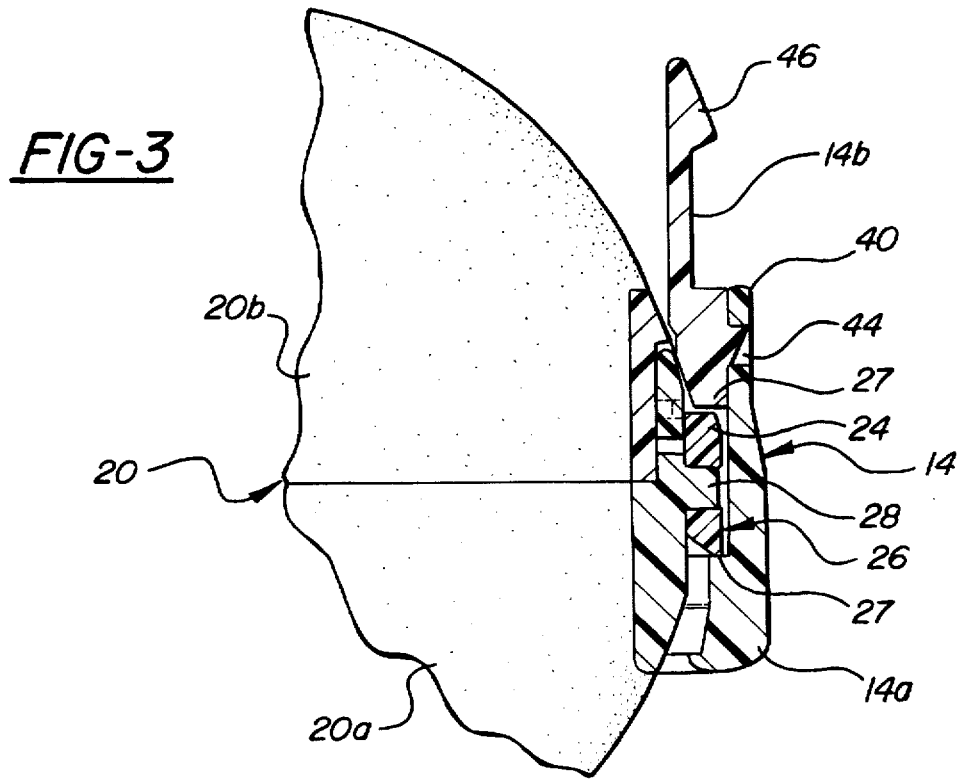
FIG. 3 is a cross-sectional view taken along lines 3—3 of FIG. 1.

An air outlet assembly 10 for directing air in a plurality of directions is generally illustrated in FIG. 1. The outlet assembly 10 allows the occupant to selectively direct air in any direction. The outlet assembly 10 is illustrated as being mounted in an instrument panel 12 of the vehicle. It is to be understood that the outlet assembly 12 may be utilized in other applications, as can be appreciated by the teachings hereof.

The outlet assembly 10 includes a housing 14 having an air inlet 16 and an air outlet 18. The air inlet and outlet 16,18 extend along a common plane such that air flows straight through the housing 14 when not otherwise redirected. The housing 14 is of generally cylindrical shape with arcuate or bowed sides 13, and particularly the interior surface thereof. A cross-section of the housing 14 provides a circular interior housing surface 15. The air inlet 16 is generally mounted in the interior of the instrument panel 12 whereas the air outlet 18 is flush with or extends from the outer surface of the instrument panel 12 and accessible by the occupant of the vehicle. The occupant of the vehicle may direct the air flowing from the air outlet 18 in various directions.

The outlet assembly 10 also includes an eyeball or barrel 20 rotatable within the housing 14. The barrel 20 includes directional vanes 22 connected across the barrel 24 for redirecting air from the air inlet 16 to the air outlet 18. The barrel 20 is also of generally cylindrical shape and includes sides 21 having a longitudinal length less than the longitudinal length of the housing 14. The sides 21 are arcuate or bowed along the longitudinal length at its exterior surface to compliment the interior surface of the housing 14.

The directional vanes 22 include a plurality of parallel vanes connected across the barrel 20 wherein the occupants may pivot or rotate the barrel 20 with the directional vanes 22 to redirect the air to any selected position in a universal type motion. In the preferred embodiment, there are included three directional vanes 22. A center directional vane 22a is connected across a diameter of the barrel 20 and is comprised of a generally sheet material having arcuate sides 23 which extend outwardly from the barrel 20 to allow the user to grab the arcuate side 23 in order to pivot the barrel 20 within the housing 14. Such center directional vane 22a act as a knob or handle to allow the occupant to operate the outlet assembly 10. The remaining two vanes 22 are spaced on either side of the center vane 22a and extend outwardly from the barrel 20 a lesser distance to create a substantially spherical effect with the barrel 20.

A retainer ring 24 rotatably interconnects the housing 14 and the barrel 20. The retainer ring 24 defines a first axis A extending along a diameter of the retainer ring 24 and a second axis B extending longitudinally through the retainer ring 24 transverse to the first axis A. One of the barrel 20 and the housing 14 is connected to the retainer ring 24 to be relatively rotatable solely about the first axis A and the other of the housing 14 or the barrel 20 is connected to the retainer ring 24 to be relatively rotatable solely about the second axis B. In the preferred embodiment, the two axes A,B are perpendicular to one another and lie in a plane which cuts through the diameter of the retainer ring 24.

The retainer ring 24 is generally formed of a resilient and flexible, plastic material which retains its ring shape in its natural state. The retainer 24 has sides 25 which extend a longitudinal length less than the length of the barrel 20 and of the housing 14 so as to be hidden within the assembly 10.

The outlet assembly 10 further includes a guide 26 operatively connected to one of the housing 14 or the barrel 20 to slideably engage the retainer ring 24 with the one of the housing 14 or barrel 20 to allow sliding rotation about the second axis B. Furthermore, the assembly 10 also includes at least one pivot point pin 28 operatively connected to the other of the barrel 20 or housing 14 to pivotally connect along the diameter of the ring to the other of the barrel 20 or housing 14 to pivot about the first axis A.

In the preferred embodiment, the housing 14 includes the guide 26 on its interior housing surface 15 to allow the retainer ring 24 to slideably rotate along a single cross-section of the housing 14 about the second axis B. The guide 26 is formed by a recessed slot in the circumference of the interior surface 15 of the housing 14. Shoulders 27 formed by the slot maintain the retainer ring 24 therewithin.

Furthermore, the barrel 20 includes a circular outer barrel surface established by its side 25. The first pivot point pin 28 extend outwardly from the side 21 of the barrel 20 and engages the retainer ring 24. A second pivot point pin 30 extends outwardly from the opposite side of the barrel 20, i.e. across the diameter of the barrel 20 opposing the first pivot point pin 28. The retainer ring 24 includes first and second opposing apertures 34,36 to receive the pivot point pins 28,30 in secure pivotal relation therewith.

In operation, the retainer ring 24 slides about the second axis B within the housing 14 and along the guide 26 at a single cross-section location in the housing 14. This allows the barrel 20 to rotate the vanes 22 between horizontal and vertical positions. The barrel 20, being connected by the pivot point pins 28,30 to the retainer ring 24, allows the barrel 20 to be pivoted about the first axis A with respect to the retainer ring 24 which in turn allows the vanes 22 to move side to side and upward and downward (and any angle therebetween) with respect to the housing 14. Therefore the barrel 20 effectively can rotate in a complete universal motion by the retainer ring 24.

It should be appreciated that the attachment of the pins 28,30 and guide 26 may be reversed to obtain the same relative rotation of the barrel 20 within the housing 14. In other words, the retainer ring 24 may be connected to the housing 14 by the pins 28,30 whereas the retainer ring 24 may be connected to the barrel 20 in a guide 26.

In the preferred embodiment, all of the outlet assembly 10, including the housing 14, barrel 20 and retainer ring 24, are molded of a plastic material. In the preferred embodiment, the retainer ring 24 is made of a material different from that of the housing 14 and barrel 20 to reduce friction during outlet operation. In the preferred embodiment, the retainer ring 24 is made of Acetal and the housing 14 and barrel 20 are made of ABS. However, it is to be understood that other material may be utilized to create a similar affect.

FIG. 2 illustrates the more detailed components forming the outlet assembly 10. It is also to be understood that such components may be molded as different parts to preform the same or equivalent function as defined above. In the preferred embodiment, the barrel 20 is formed of two identical halves 20a,20b snap fit together. The barrel 20 includes a longitudinal length approximately two times the length of the retainer ring 24. Furthermore, the sides 21 of the barrel 20 includes a slight curvature or concave shape to cooperate with the semi-spherical shape of the interior of the housing 14. The directional vanes 22 are each also produced in two semi-circular halves with the barrel halves 20a,20b to produce a continuous vane 22 once the barrel 20 is assembled. It should be understood that the vanes 22 may be formed separately and snap fit into the barrel 20. One of the pivot point pins 28,30 extends from each half of the barrel 20 and are molded therewith, such that after assembly, the pivot point pins 28,30 oppose one another on each side 21 of the barrel 20. A flange or tab 32 extends from each barrel half 20a,b and includes the pin 28,30 extending therefrom along with a pair of locking apertures 34. The flange 32 fits against the other barrel half 20a,b which includes locking pins 36 extending therefrom to snap the barrel halves 20a,b to one another.

The retainer ring 24 is generally resilient molded plastic such that it may be flexed and spring back to its original ring shape. Furthermore, the flex of the retainer ring 24 allows the retainer ring 24 to be flexed in order to allow insertion of the pivot point pins 28,30 within the apertures 34 during assembly. The retainer ring 24 includes spaced circumferential slots 38 extending along the circumference to aid in flexing of the ring 24.

The housing 14 is also molded and assembled in halves 14a,b. A first or front half 14a of the housing 14 includes a stepped interior surface providing the shoulder 27 of the guide 26. The second or rear half 14b includes an arcuate interior surface whose edge or end established the other shoulder 27 forming the guide 26. The two halves 14a,b may be snap fit together. The front half 14a includes a plurality of tabs 40 extending therefrom with openings 42 in the ends thereof to lock with projections 44 extending radially outwardly. The projections 44 are snapped or received in the openings 42 to secure the halves 14a,b to one another. The snap fit assembly of the housing 14 secures the retainer ring against the guide.

In assembly, the halves 20a,b of the barrel 20 are first snapped or otherwise secured to one another. Thereafter, the retainer ring 24 is placed about the barrel 20 and is flexed to allow the pivot point pins 28,30 to enter the apertures 34, and released so the ring 24 is pivotally secured to the barrel 20. Thereafter, the ring 24 is placed between the housing halves 14a,b and the housing halves 14a,b are snap fit to one another securing the retainer ring 24 within the housing 14. The barrel 20 may freely pivot about the pivot points pins 28,30 in 360°. The ring 24 may also rotate in the guide 26 in a full 360°.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An air outlet assembly for directing air in a plurality of directions, said assembly comprising:

a housing having an air inlet and an air outlet and a circular interior housing surface;

a barrel rotatable within said housing and including directional vanes connected across said barrel for directing air in a plurality of directions;

a retainer ring of circular shape having a circumferential wall with at least one aperture formed in said wall, and rotatably interconnecting said housing and said barrel, and defining a first axis extending along a diameter of said retainer ring and a second axis extending longitudinally through said retainer ring transverse to said first axis, one of said barrel or said housing connected to said retainer to be relatively rotatable solely about said first axis and the other of said housing or said barrel connect to said retainer ring to be relatively rotatable solely about said second axis;

a guide operatively connected to one of said housing or said barrel to slidably engage said retainer ring with the one of said housing or said barrel to allow sliding rotation about said second axis:

one of said housing and said barrel including pivot pin extending therefrom for engagement with said aperture of said retainer ring for pivoting with respect thereto;

said retainer ring being made of flexible material to allow flexing during assembly of said retainer ring against said pivot pin and continued retention of said circular shape thereafter.

2. An assembly as set forth in claim 1 wherein said housing includes said guide in said interior housing surface to allow said retainer ring to slideably rotate along a single cross section of said housing about said second axis.

3. An assembly as set forth in claim 2 wherein said barrel includes a circular outer barrel surface, and said at least one pivot point pin extending outwardly from said outer barrel surface and engaging said retainer ring.

4. An assembly as set forth in claim 3 further including a second pivot point pin extending outwardly from said outer barrel surface opposing said first pivot point pin across a diameter of said barrel.

5. An assembly as set forth in claim 4 wherein said retainer ring includes first and second opposing apertures receiving said pivot point pins in pivotal rotation thereof.

6. An assembly as set forth in claim 1 wherein said directional vanes are fixedly connected in a predetermined position with said barrel.

7. An assembly as set forth in claim 1 wherein said housing is comprised of two half portions including locking fingers extending from at least one of said half portions for retainably snapping said half portions to one another.

8. An assembly as set forth in claim 1 wherein said barrel halves are identically molded.

9. An assembly as set forth in claim 1 wherein said retainer ring includes openings therein for allowing flexing of said retainer ring.

10. An assembly as set forth in claim 1 wherein said retainer ring is of a material different from said housing and said barrel to decrease rotational friction therebetween.

11. An assembly as set forth in claim 1 wherein said barrel is comprised of at least two molded half portions and including locking fingers extending from at least one of said half portions to engage the other of said half portions for retainably snapping said half portions to one another forming said barrel.

12. An air outlet assembly for directing air in a plurality of directions, said assembly comprising:

a housing having an air inlet and an air outlet and a circular interior housing surface;

a barrel rotatable within said housing and including directional vanes connected across said barrel for directing air in a plurality of directions;

a retainer ring rotatably interconnecting said housing and said barrel, and defining a first axis extending along a diameter of said retainer ring and a second axis extending longitudinally through said retainer ring transverse to said first axis, one of said barrel or said housing connected to said retainer to be relatively rotatable solely about said first axis and the other of said housing or said barrel connect to said retainer ring to be relatively rotatable solely about said second axis;

said barrel comprising two separate and identically molded half portions and each including molded cooperative snaps which secure said half portions to one another to form said barrel; and said housing being comprised of two half portions and including locking fingers extending from at least one of said half portions for retainably snapping said half portions to one another about said barrel forming said housing.

13. An assembly as set forth in claim 12 wherein said housing includes said guide in said interior housing surface to allow said retainer ring to slideably rotate along a single cross section of said housing about said second axis.

14. An assembly as set forth in claim 13 wherein said barrel includes a circular outer barrel surface, and said at least one pivot point pin extending outwardly from said outer barrel surface and engaging said retainer ring.

15. An assembly as set forth in claim 14 further including a second pivot point pin extending outwardly from said outer barrel surface opposing said first pivot point pin across a diameter of said barrel.

16. An assembly as set forth in claim 15 wherein said retainer ring includes first and second opposing apertures receiving said pivot point pins in pivotal rotation thereof.

17. An air outlet assembly for directing air in a plurality of directions, said assembly comprising:

a housing having an air inlet and an air outlet and a circular interior housing surface;

a barrel rotatable within said housing and including directional vanes connected across said barrel for directing air in a plurality of directions;

a retainer ring rotatably interconnecting said housing and said barrel, and defining a first axis extending along a diameter of said retainer ring and a second axis extending longitudinally through said retainer ring transverse to said first axis, one of said barrel or said housing connected to said retainer to be relatively rotatable solely about said first axis and the other of said housing or said barrel connect to said retainer ring to be relatively rotatable solely about said second axis;

a guide operatively connected to one of said housing or said barrel; and said housing comprising a first half portion including an arcuate surface and a step therein to provide a first shoulder and a base portion of the guide, and a second half portion including an arcuate surface extending to an abutment end that when said first and second halves are assembled to one another said abutment end provides a second shoulder of said guide, said first shoulder and said base portion comprising said step and said second shoulder formed by said abutment end establishing a recess slot comprising said guide.

* * * * *